(12) United States Patent
Xu et al.

(10) Patent No.: US 7,869,631 B2
(45) Date of Patent: Jan. 11, 2011

(54) AUTOMATIC SKIN COLOR MODEL FACE DETECTION AND MEAN-SHIFT FACE TRACKING

(75) Inventors: Xiao-Dong Xu, Hangzhou (CN); Jin Wang, Hangzhou (CN)

(73) Assignee: Arcsoft, Inc., Fremont, CA (US)

( * ) Notice: Subject to any disclaimer, the term of this patent is extended or adjusted under 35 U.S.C. 154(b) by 1028 days.

(21) Appl. No.: 11/636,487

(22) Filed: Dec. 11, 2006

(65) Prior Publication Data

US 2008/0137957 A1 Jun. 12, 2008

(51) Int. Cl.
    *G06K 9/00* (2006.01)
(52) U.S. Cl. ......................... 382/118; 382/103; 382/170
(58) Field of Classification Search ................. 382/103, 382/118
    See application file for complete search history.

(56) References Cited

U.S. PATENT DOCUMENTS

| | | | |
|---|---|---|---|
| 6,590,999 B1 * | 7/2003 | Comaniciu et al. | 382/103 |
| 6,754,389 B1 * | 6/2004 | Dimitrova et al. | 382/224 |
| 7,003,135 B2 * | 2/2006 | Hsieh et al. | 382/103 |
| 7,027,622 B2 * | 4/2006 | Pengwu | 382/118 |
| 7,130,446 B2 * | 10/2006 | Rui et al. | 382/103 |
| 7,146,028 B2 * | 12/2006 | Lestideau | 382/118 |
| 7,536,029 B2 * | 5/2009 | Choi et al. | 382/103 |
| 2006/0126941 A1 * | 6/2006 | Higaki | 382/190 |
| 2007/0098218 A1 * | 5/2007 | Zhang et al. | 382/103 |

OTHER PUBLICATIONS

Bradski, G.R. (1998) "Computer vision face tracking for use in a perceptual user interface." Intel Technology Journal Q2 '98, Intel Corporation.*
Comaniciu et al. (2000) "Robust detection and tracking of human faces with an active camera." Proc. 3$^{rd}$ IEEE Int'l Workshop on Visual Surveillance, pp. 11-18.*
Garcia et al. (Sep. 1999) "Face detection using quantized skin color regions merging and wavelet packet analysis." IEEE Trans. on Multimedia, vol. 1 No. 3, pp. 264-277.*
Lerdsudwichai et al. (Mar. 2005) "Tracking multiple people with recovery from partial and total occlusion." Pattern Recognition, vol. 38 No. 7, pp. 1059-1070.*
Vezhnevets et al. (Sep. 2003) "A survey on pixel-based skin color detection techniques." Proc. GraphiCon 2003, pp. 85-92.*

(Continued)

*Primary Examiner*—Brian P Werner
*Assistant Examiner*—Barry Drennan
(74) *Attorney, Agent, or Firm*—Bacon & Thomas, PLLC

(57) ABSTRACT

The present invention discloses a method of automatically detecting and tracking a face by an electronic capturing device that alternatively uses a face detecting algorithm to quickly locate a face in a frame based on a skin color model and a face tracking algorithm to locate a face in subsequent frames by a nonparametric technique and a mean shift algorithm. If the face tracking algorithm cannot track and locate a face correctly, the face detecting algorithm will be used again to detect a face position in another new frame until the face position is located successfully, and then the face tracking algorithm will be used again for detecting and locating the face position in subsequent frames. After this method has detected a face position, a variable focal lens is used to slowly and smoothly refocus the frame including a face region, so as to obtain a clear face image.

29 Claims, 7 Drawing Sheets

OTHER PUBLICATIONS

Wang et al. (Jul. 2001) "A novel approach for human face detection from color images under complex background." Pattern Recongnition, vol. 34 No. 10, pp. 1983-1992.*

Jordao et al, (Sep. 1999) "Active face and feature tracking." Proc. 1999 Int'l Conf. on Image Analysis and Processing, pp. 572-576.*

* cited by examiner

AUTOMATIC SKIN COLOR MODEL FACE DETECTION AND MEAN-SHIFT FACE TRACKING

FIELD OF THE INVENTION

The present invention relates to a method of automatically detecting and tracking a face by an electronic capturing device, and more particularly to a method that uses a face detecting algorithm and a face tracking algorithm alternatively for detecting and locating a face in a frame quickly and reducing CPU consumption of the electronic capturing device effectively.

BACKGROUND OF THE INVENTION

As digital camera related technologies advance rapidly in recent years, various electronic devices (such as digital cameras, digital camcorders, notebook computers, mobile phones and webcams, etc) are introduced constantly to the market. Not only the quality becomes increasingly higher, but the volume of products also becomes increasingly smaller, and thus their market price becomes lower gradually. Therefore, these electronic image capturing devices available in the market become popular. Although many digital imaging devices are equipped with advanced functions such as an auto focus and an auto exposure, an image information can be obtained after a whole scene is sensed to determine whether or not to capture the image information, and a face only occupies a small portion of the whole scene, and thus a novice having little experience and skill of properly adjusting a shutter and a diaphragm cannot capture satisfactory and praised images. Therefore, it is an important subject for electronic imaging device designers and manufacturers to find a way of designing an electronic imaging device with a smart imaging function to meet the photographic requirements of consumers, compensating the consumers' insufficient skills of taking a picture, effectively saving the long adjusting procedure and time, and taking high-quality images.

To achieve an electronic imaging device with a smart imaging function and capable of taking high quality images, some manufactures have applied face detection technologies to the new types of electronic imaging devices, wherein the algorithm for detecting a face has been disclosed in many publications, and the most popular one is the face detector designed according to a Gentle Adaboost (GAB) algorithm, and the face detector uses a Haar-like feature to identify a face and a specific quantity of face pattern samples to train a required face classifier to determine which image of the scene belongs (or not belongs) to a face, so as to detect a face in the image and provide a quick identification. However, if a new model of electronic capturing device having a face detector is used for detecting and recognizing a face in a preview image, the face detector must be able to perform a detecting process for the whole image and complete a huge numerical computation in order to detect an unknown face newly present or already resided in a previous frame (or a current frame), and thus the processing speed will be slowed down significantly. An image of 120×160 pixels is taken for example, and a traditional face detector uses ten searching windows of different dimensions for searching a face in a preview image, and the dimensions of the searching windows are modified horizontally and vertically one by one and moved horizontally and vertically on the whole image, so as to search a face repeatedly. Therefore, the number of computations involved in the detecting process is huge and causes poor detection speed and efficiency, and such arrangement cannot meet customer requirements and definitely requires improvements.

SUMMARY OF THE INVENTION

In view of the shortcomings of the traditional electronic capturing device having the low face detection speed and efficiency, the inventor of the present invention based on years of experience to conduct extensive researches and experiments, and finally invented a method of automatically detecting and tracking a face by an electronic capturing device in accordance with the present invention, in hope of detecting and locating a face in a frame more quickly and effectively.

Therefore, it is a primary objective of the present invention to provide a method of automatically detecting and tracking a face by an electronic capturing device that uses a face detecting algorithm and a face tracking algorithm alternatively for detecting and locating a face in a frame quickly and reducing a high CPU consumption of the electronic capturing device effectively. The method uses a face detecting algorithm to quickly locate a face in a frame based on a skin color model and a face tracking algorithm to locate a face in subsequent frames by a nonparametric technique and a mean shift algorithm. If the face tracking algorithm cannot track and locate a face correctly, the face detecting algorithm will be used again to detect a face position in another new frame until the face position is located successfully, and then the face tracking algorithm will be used again for detecting and locating the face position in subsequent frames. After this method has detected a face position, a variable focal lens is used to slowly and smoothly refocus the frame including a face region, so as to obtain a clear face image.

To make it easier for our examiner to understand the objective, technical characteristics and performance of the present invention, preferred embodiments accompanied with related drawings are used for illustrating the present invention as follows.

DETAILED DESCRIPTION OF THE PREFERRED EMBODIMENTS

Figure 2:
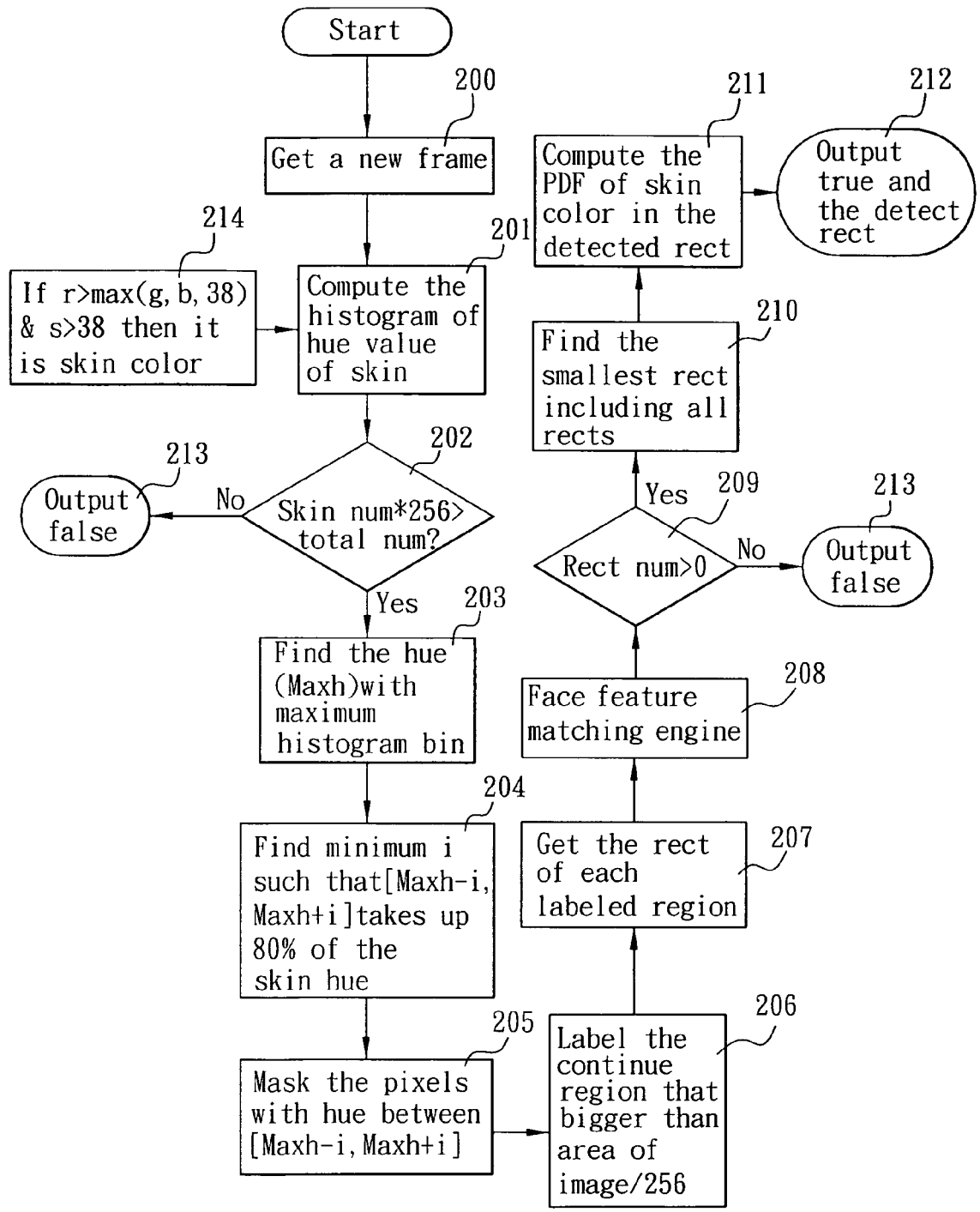
FIG. 2 is a flow chart of a face detecting algorithm of the present invention.

Referring to FIG. 2 for a method of automatically detecting and tracking a face by an electronic capturing device, the method comprises a face detecting algorithm and a face tracking algorithm, wherein the face detecting algorithm effectively and quickly detects a face position in a frame based on a skin color model, and the face tracking algorithm uses a mean shift algorithm and a climbing color density gradient to calculate the peak of a color probability distribution. The invention modifies the mean shift algorithm to deal with a changing dynamic color distribution of frame sequences captured by an electronic capturing device. Once if a face of any frame is detected, the method of the invention will refocus the face in the frame by using a variable focal lens to refocus a face region in the frame slowly and smoothly between subsequent frames to obtain a clearer and more accurate face image.

Figure 1:
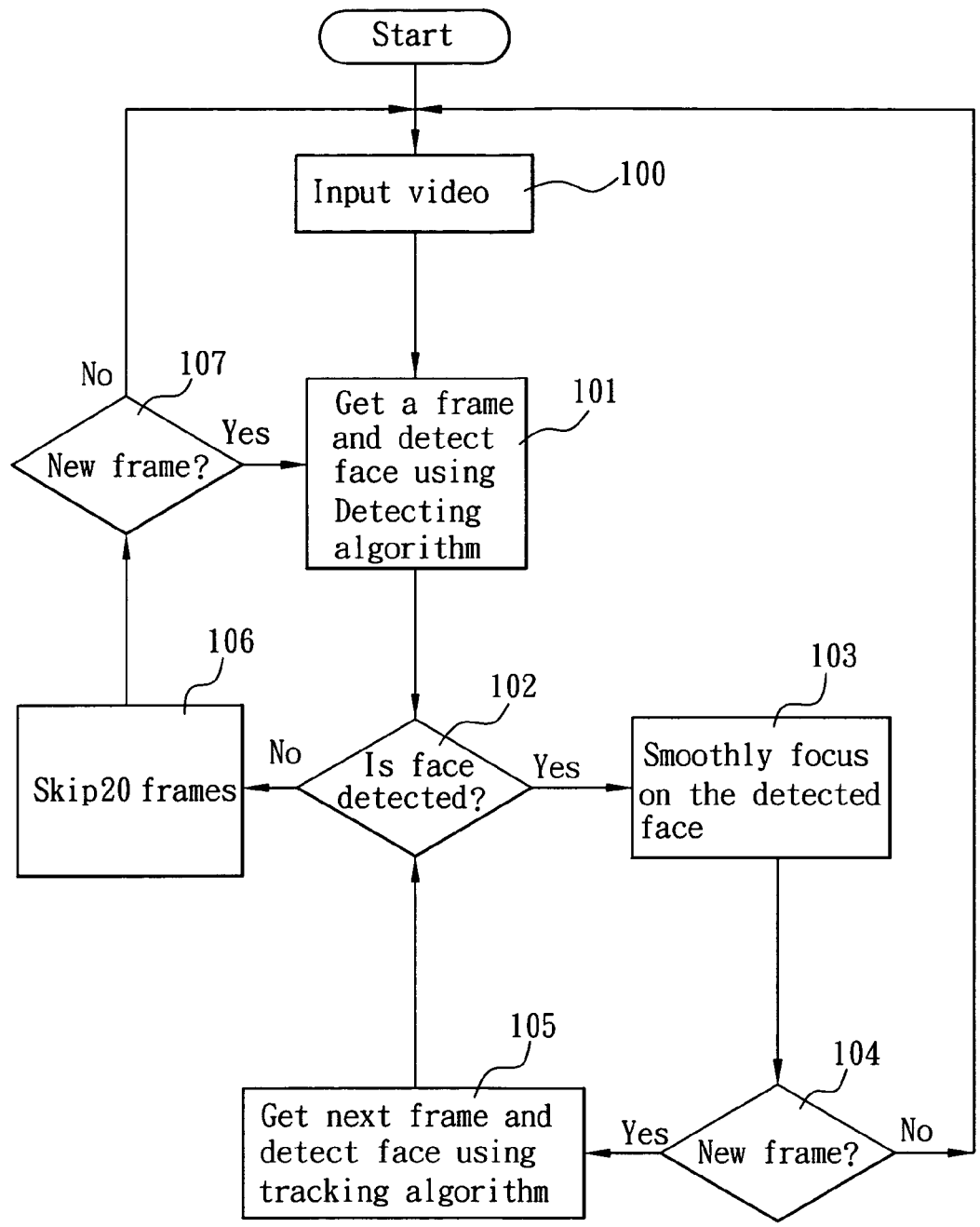
FIG. 1 is a flow chart of a preferred embodiment of the present invention.

In view of the speed of the face detecting algorithm which is slower than the speed of the face tracking algorithm, the method of the invention quickly and effectively detects a face position by alternatively using the face detecting algorithm and the face tracking algorithm. In other words, the face detecting algorithm successfully locates a face position in a frame and then uses the face tracking algorithm to locate the face position in subsequent frames. Once if the face tracking algorithm cannot correctly track and locate a face position, the face detecting algorithm will be used again to detect a face position in the next new frame until a face position in the new frame is located successfully. The present invention further reduces a high CPU consumption of the electronic capturing device and avoids using the face detecting algorithm to detect a face position for each new frame that will cause a waste of CPU consumption whenever the electronic capturing device cannot accurately track and locate the face position. Referring to FIG. 1 for a preferred embodiment of the present invention, the face detecting algorithm is set to be used once for every 20 new frames, until a face position is located successfully, and the method comprises the steps of:

Step 100: continuously capturing frames;

Step 101: reading a frame, and using a face detecting algorithm to detect a face in the frame;

Step 102: determining whether or not the frame includes a face; if yes, then go to Step 103, or else go to Step 106;

Step 103: controlling a variable focal lens of an electronic capturing device to slowly and smoothly focus on a region containing a face in the frame to obtain a clear and accurate face frame;

Step 104: determining whether or not to capture a new frame; if yes, then go to Step 105, or else return to Step 100;

Step 105: reading a new frame, and using a face tracking algorithm to track a face in the new frame, and go to Step 102;

Step 106: skipping 20 subsequent captured frames; and

Step 107: determining whether or not a new frame is captured; if yes, then go to Step 101; or else return to Step 100.

If the electronic capturing device captures a frame in accordance with the present invention, the face detecting algorithm analyzes a hue, a saturation and a value (HSV) of the frame and a hue feature distribution of a color space to compute the color range for all color pixels of a face on the frame, and divide the face from the frame based on the color range in the subsequent calculation process and compute an initial face region. The face detecting algorithm further uses a spatial feature to distinguish a human face or a non-human face having the same color. Referring to FIG. 2, the method is described as follows:

Step 200: Read a new frame, and perform a color transformation, wherein the color transformation is preformed for a skin color traditionally in a standard NCC r-g chromaticity space, and the r-g chromaticity space is a two-dimensional chromaticity space, and there is no information of its color intensity; for example, the hue of a pixel is composed of the intensity of three colors: red, green and blue in the RGB chromaticity space, and thus the (r,g,b) value of a bright red color can be represented by (255,0,0) and the (r,g,b) value of a dark red color can be represented by (40,0,0), but the hue of a pixel in the r-g chromaticity space is composed of three colors: red, green and blue according to a proportion in the RGB chromaticity space instead of the intensity of each color. Since the sum of the proportion of -three colors must be equal to one, therefore the performance on the r-g chromaticity space just describes the proportion of red and green colors, and the proportion of blue color is derived from the proportion of red and green colors. Although the r-g chromaticity space contains less information than the RGB or HSV chromaticity space and has some characteristics favoring the visual applications of a computer, it is noteworthy that if a capturing device views a scene which is not projected evenly by a light source such as a spotlight, a certain color object will be moved together with the spotlight in the scene to change its apparent color. If the apparent color is used for tracking a scene in a RGB image, it will create a problem of the tracking, and the r-g chromaticity space lacks of information on the characteristics of color intensity for effectively compensating this problem, and thus the apparent color of the scene can be maintained constant all the time. However, if different colored light sources are projected onto different positions of a scene, the same problem of the tracking will recur. The transformation of r-g chromaticity space and RGB chromaticity space refers to transforming the color (R, G, B) of a pixel to (r, g) by the following transformation formula, wherein (R, G, B) stands for the intensity of three colors: red, green and blue respectively and (r, g) stands for the proportion of the original colors: red and green:

$$r = \frac{R}{R+G+B}$$
$$g = \frac{G}{R+G+B}$$

In the foregoing transformation process, the information of color intensity, cannot reversely transform the r-g chromaticity space into the RGB chromaticity space. For example, if (r, g) is equal to (⅓, ⅓), then the proportion of red color is equal to the proportion of green color, but it is insufficient to determine the corresponding proportion of red, grey or white color. Since the color transformation from the RGB chromaticity space to the r-g chromaticity space is a two-dimensional calculation, which can greatly increase the computational complexity. In view of the problem, the inventor of the present invention conducted extensive experiments and designed a very stable and suitable color component to represent the color characteristic for the hue component in the HSV chromaticity space, and the one-dimensional calculation is much simpler than the transformation into the r-g chromaticity space. Therefore, the present invention transforms the image color into the HSV chromaticity space, and analyzes the hue feature distribution to naturally and greatly simplify the computational complexity, and effectively enhance the speed of the color transformation for the skin color.

Step 201: With the following conditions: if r>max(g,b,38) and s>38, then it is considered to be a skin color, and a histogram of hue of skin on the new frame is computed. It is noteworthy to point out that with the foregoing conditions, S in the HSV stands for the component of S (saturation) which is an experiment parameter 38=255*0.15. Since V in the HSV is equal to V=max(r,g,b), it is necessary to have r>max(g,b, 38) to eliminate the points with V<38, because the brightness and reliability of these points are lower, and thus these points will be eliminated. Therefore, it requires s>38 based on the same theory. In the meantime, it is necessary to have r>max(g, b) because the r component in the skin color region usually has the largest value. If the r component is not the largest, it shows that the h component is not in the skin color range. Therefore, it is not necessary to calculate the H (hue) value to determine whether or not a point is a skin color, so as to skip many unnecessary computations to expedite the computation substantially. The experiment shows that this determination method has a significant effect on improving the computational speed.

In the face detecting algorithm of the present invention, it is necessary to complete a histogram analysis for the whole frame. If the image contains a plurality of faces, the histogram will be in the likely skin range. For example, a peak appears in a range of rotated hue equal to 150~240 to obtain the face feature distribution.

Step 202: Determine whether or not the number of pixels of the face skin color matches the following condition:

Number of pixels of face skin color *256>Total number of pixels on the frame.

Since the skin color model is not very reliable, the H value of the non-skin region may fall within the skin color region and many figures have such region, and thus it may easily cause errors to the detection. The foregoing condition sets a threshold for the number of pixels of face skin color to assist improving the accuracy for the determination. If the number of pixels of face skin color is too small, it will determine that a face does not exist at all. Although such condition cannot detect a face effectively, wrong detections can be eliminated. If the number of pixels of the face skin color matches the foregoing condition, go to Step 203; or else go to Step 213. The present invention uses the following heuristic rule to determine a threshold in order to define a face more accurately:

$$\sum_{m=l}^{u} q_m \geq 0.8$$

where $q_l$ and $q_u$ are two boundaries symmetrically lied around the peak center. Although the heuristic rule is quite subjective, the experiments show that the operations in most situations are satisfactory.

Step 203: Find the peak of a maximum hue Maxh of the histogram.

Step 204: Find the smallest value i, such that the hue H of all pixels in the frame falls in the hue range of the histogram: [Maxh−i, Maxh+i] that occupies 80% of the hue of the face skin color. It is noteworthy to point out that the foregoing hue range refers to the points in the skin color range for computing the statistics for the histogram. Since the present invention tries to obtain a wider skin color range that may include faces of various different races, and the skin color range of a face in each preferred embodiment may occupy a small portion only. Therefore, the present invention bases on the statistics of an actual range [Maxh−i, Maxh+i] of the skin color in this embodiment to determine whether or not the pixel is a skin color. If the hue H of the pixel falls in the range of [Maxh−i, Maxh+i], then it is considered as a skin color. Thus, the smaller the hue range, the more accurate is the determination of skin color.

After the histogram analysis is completed, the present invention uses a simple rule to determine whether or not the hue of the pixel x in the frame is a face skin color:

$$l \leq h(x) \leq u$$

where h(x) represents the hue of the pixel x; u and l represent the upper and lower thresholds of the hue of face skin color, and a binary face image can be obtained based on the thresholds, and the white pixel represents a face.

Step 205: Form a mask for the pixel falling within the range [Maxh−i, Maxh+i] for all hues in the new frame.

Step 206: Mark a label for all continued regions in the new frame that match the following condition: Number of pixels>Total number of pixels in the frame/256.

Figure 3:
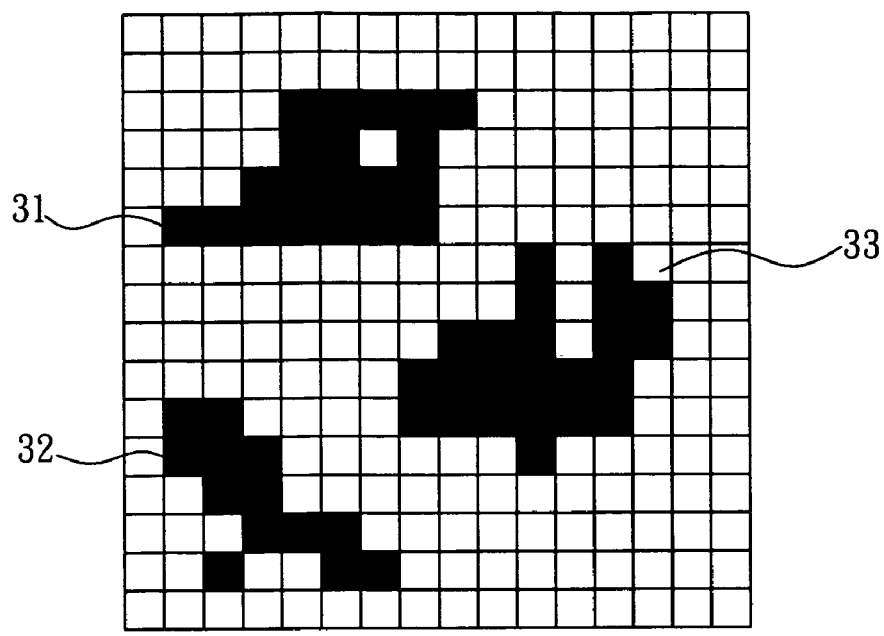
FIG. 3 is a schematic view of performing a region labeling for a frame.
Figure 4:
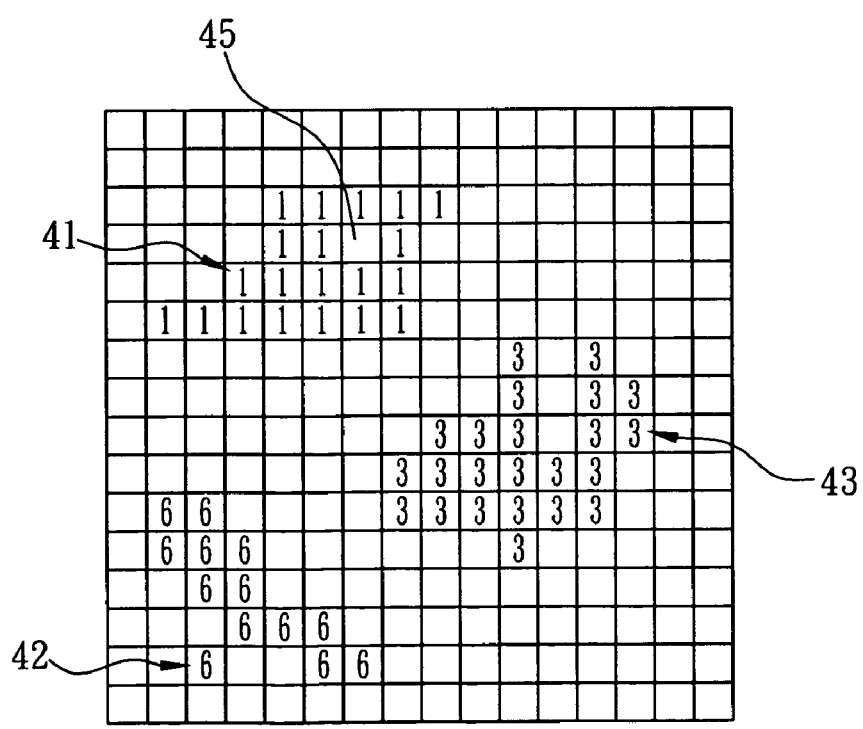
FIG. 4 is a schematic view of labeling a region as depicted in FIG. 3.
Figure 5:
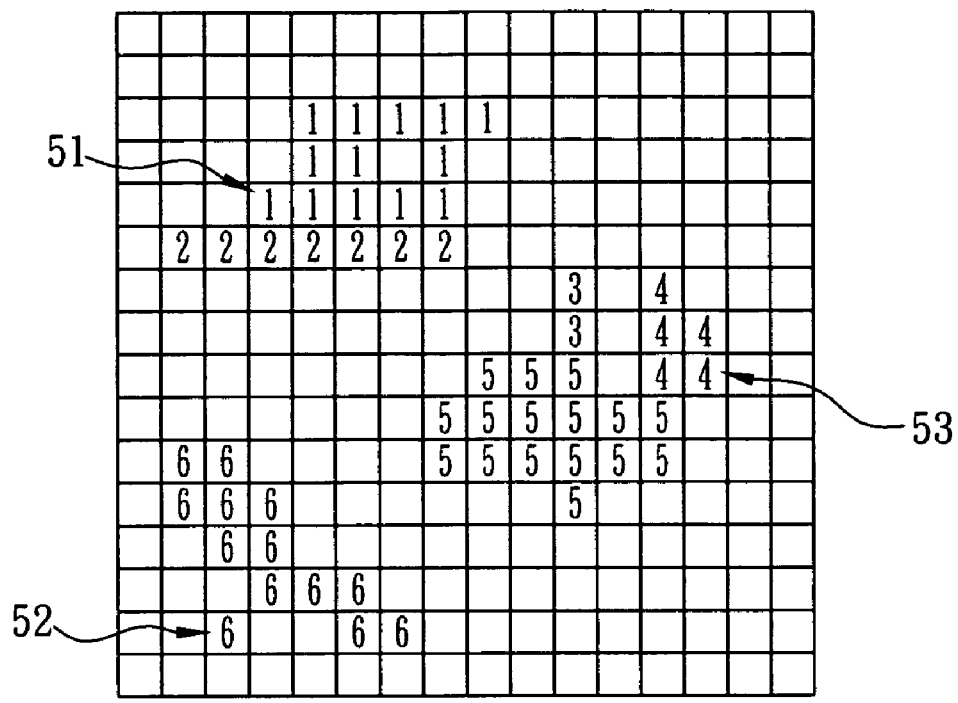
FIG. 5 is a schematic view of completing a region labeling of a frame.
Figure 6:
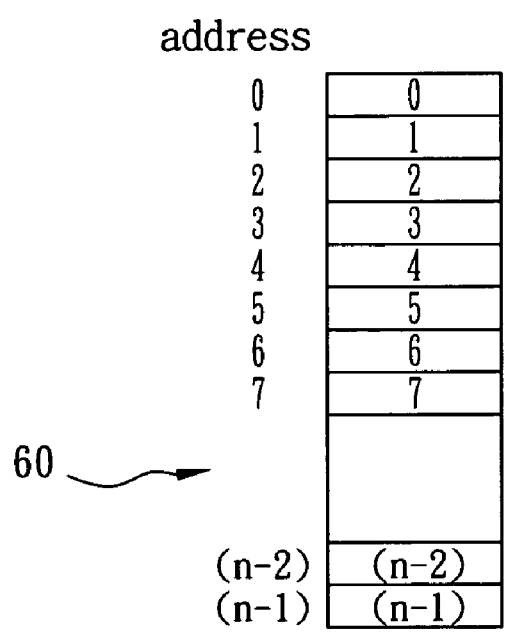
FIG. 6 shows a list for compiling temporary labels assigned in a same foreground region.

In other words, a threshold is set to the number of pixels to assist improving the accuracy. If the number of pixels is too small, it is determined that the continued region does not exist. To cope with a morphological operation, the region labeling algorithm is used for processing a plurality of likely face regions. The region extraction and the region labeling are fundamental processes generally used in computer systems for automatically analyzing and interpreting an image sequence of a scene, wherein the region extraction is used for analyzing meaningful regions and characteristics in a noteworthy frame within a given domain. For example, a human face is analyzed in a face recognition and surveillance application. The region labeling is a method used in an image-processing task for enhancing computer computations. For simplicity, a region not labeled in a frame is a group of connected picture elements or pixels in the frame. If a path exists between a foreground pixel P and another foreground pixel Q horizontally, vertically or diagonally, the foreground pixel P is called "eight-connected" to another foreground pixel Q, and if a diagonal path does not exist between the foreground pixel P and the other foreground pixel Q, then the foreground pixel P is called "four-connected" to the other foreground pixel Q. Referring to FIG. 3 for a frame, the black pixel shows three eight-connected foreground regions 31, 32, 33. Although the pixels of the foreground and the background can be separated by thresholding easily, many applications including motion estimation, tracking or object recognition assign a unique label to each foreground region 31, 32, 33. Referring to FIG. 4, the label includes an arbitrarily selected integer, such as 1, 3 and 6 for representing the pixel of the corresponding foreground region 41, 42, 43, In the process of handling the region labeling, the foreground region 41 often has a plurality of white pixel holes 45 that will cause deceptive difficulties and require to maintain the equivalence lists in order to tentatively and correctly assign different labels to the same foreground region, and the labels in the equivalence list corresponding to the same foreground region are finally detected and modified to a single and unique label, and thus the region labeling has to complete the following two actions for the frame:

(1) Referring to FIG. 5 for the first action, the labels (such as 2, 4 and 5) are tentatively assigned to the pixels of the same foreground region 51, 52, 53. The same foreground region includes a plurality of tentative labels; and (2) Referring to FIG. 6 for the second action, all tentatively assigned labels within the same foreground region are compiled, and a list 60 is used for correcting the tentative labels into a single and unique label. For example, the tentative labels 3, 4 and 5 correspond to a single and unique label 3.

Step 207: Compute a rectangle of a region corresponding to each marked label.

Figure 7:
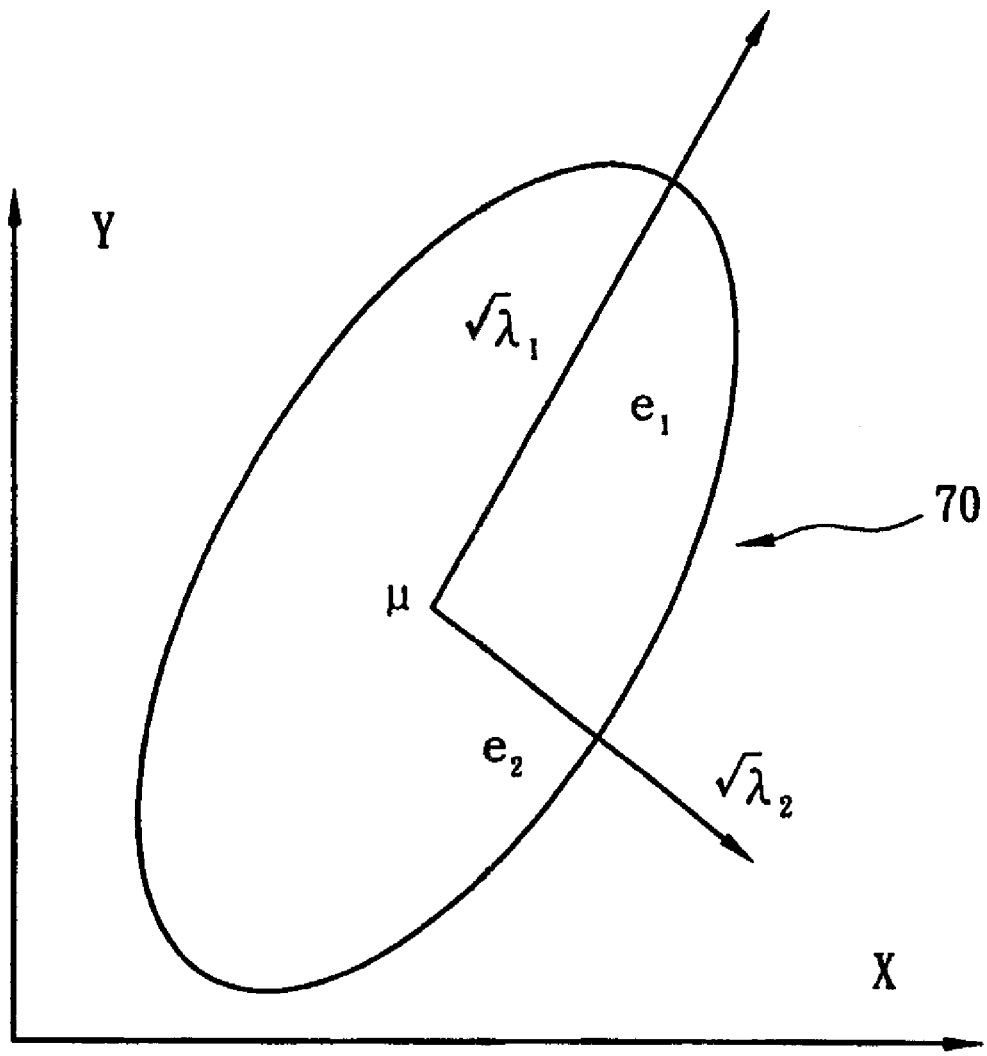
FIG. 7 is a schematic view of an ellipse used for matching a plurality of plurality of likely face regions in accordance with the present invention.

Step 208: Use a face feature matching engine to match the face of an image in a rectangle. If the present invention obtains a plurality of likely face regions, the regions are candidates and transferred to a face feature matching engine, and the face feature matching engine analyzes which one is a face. If a face feature matching engine matches each candidate with an ellipse 70 as shown in FIG. 7, then the candidate will be determined whether or not it has a face and the ellipse 70 corresponding to the candidate will be compared with the ratio of long radius to short radius of the predetermined threshold. It is noteworthy to point out that the ellipse 70 distributes an estimated region to the detected region. According to the statistics, the ratio of length to width of a face does not exceed 2.

In a preferred embodiment of the present invention, the predetermined threshold is set to 2.5 to reduce the adverse effects of an estimated error of the ellipse 70. If the candidate corresponding to the ratio of long radius to short radius of the ellipse 70 is greater than the predetermined threshold, then the corresponding face region of the candidate will be discarded directly. This method is used for obtaining a face region accurately. As to the pixel $x_i$ of the frame, where $i=1, \ldots, n$ it is necessary to compare the pixel $x_i$ with the ellipse 70 as shown in FIG. 7 to find a true face region closest to the ellipse 70. The present invention uses a principal components analysis (PCA) technique which is a well-known powerful distribution analysis tool as described below:

A known sample $x_i$, where $i=1, \ldots, n$, is in a form of column vector, and the present invention uses a sample mean vector $\tilde{\mu}$ and a sample covariance matrix $\tilde{\Sigma}$ to estimate the following mean vector $\mu$ and covariance matrix $\Sigma$:

$$\mu \cong \tilde{\mu} = \frac{1}{n}\sum_{i=1}^{n} x_i, \text{ and}$$

$$\Sigma \cong \tilde{\Sigma} = \frac{1}{n-1}\sum_{i=1}^{n} (x_i - \mu)(x_i - \mu)^t$$

Where, the eigenvalues $\lambda_i$ and normalized eiganvectors $e_i$ of the covariance matrix $\Sigma$ must satisfy the following equations:

$$\Sigma e_i = \lambda_i e_i$$

$$\|e_i\|=1$$

$$<e_i, e_j>=0$$

The eigenvector $e_i$ corresponding to the largest eigenvalue $\lambda_i$ of the covariance matrix $\Sigma$ is a mean direction of the sample distribution, and the eigenvector $e_i$ corresponding to the second largest eigenvalue $\lambda_i$ is a mean direction of the sample distribution and a second most important distribution, and so on. For the dimension d=2, the result can be used to determine whether or not the ellipse 70 fits the face region. Referring to FIG. 7, the center of ellipse 70 is a mean vector, and the rotation angle of the ellipse 70 is the direction of the main eigenvector. The major axis and the minor axis are selected to be $r \times \sqrt{\lambda_1}$ and $r \times \sqrt{\lambda_2}$ respectively, wherein r is simply a ratio, which falls within a range of numeric values from 1.8 to 2.2 according to experiments, and the following discard formula can be obtained:

$$\frac{\sqrt{\lambda_1}}{\sqrt{\lambda_2}} > 2.5$$

and the region that matches with the discard formula is considered to be a non-human face and will be discarded.

Step 209: Determine whether or not the quantity of rectangles is greater than zero; if yes, then go to Step 210, or else go to Step 213, provided that the quantity of rectangles is equal to zero (indicating that there is no face found).

Step 210: Find the smallest rectangle among all rectangles, and such method assumes that the algorithm of the invention focuses on a frame having at most one face. If many rectangles are detected, a face may be divided into several portions, and thus all rectangles are merged.

Step 211: Compute a skin color probability density function (PDF) in a detected rectangle of a new frame.

Step 212: Output the information of a detected face and the rectangle of a face, and end the detection program.

Step 213: Output the information of an undetected face and end the detection program.

The present invention tracks a new location and a scalar of a face by a face tracking algorithm based on a new frame F and a face region R of its last frame together with the face probability distribution P obtained by the face detecting algorithm. The invention uses the equation adopted by Intel's graphic processing and open source computer vision library (OpenCV) to compute a back projection B of the new image F, and its physical meaning corresponding to the pixel belongs to the probability of skin color:

$$B(i,j)=P(F(i,j))$$

Figure 8:
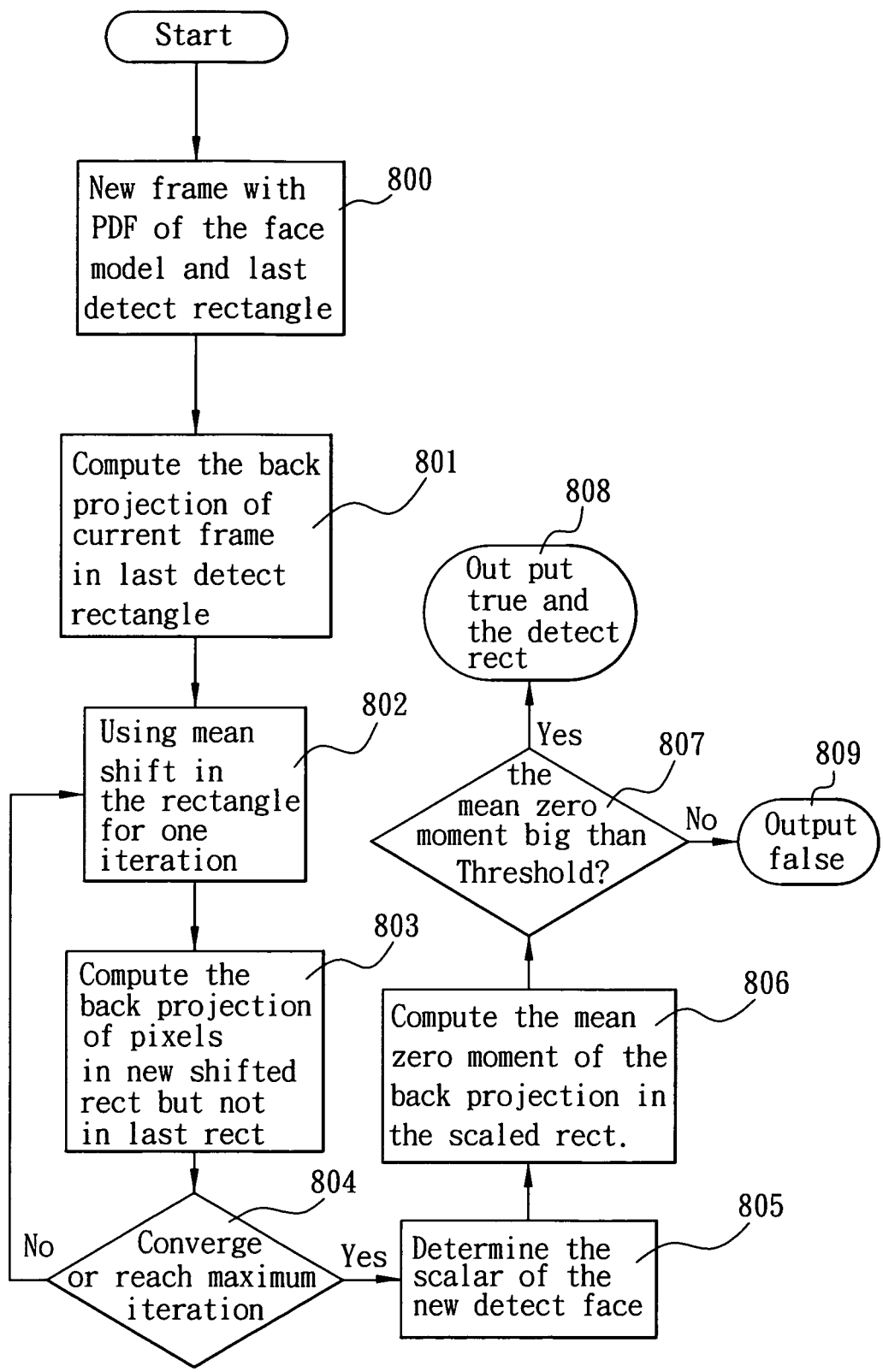
FIG. 8 is a flow chart of a face tracking algorithm in accordance with the present invention.

Once if the back projection B is obtained, the invention will immediately use a mean shift algorithm to locate the local peak mode that is close to the face region R of a previous frame on the back projection B. However, the speed of such algorithm is slow, and thus the present invention only computes the pixels of the back projection B if needed to expedite the operational speed. This method requires updating the back projection B for an iteration of each mean shift. Provided that R1 and R2 stand for an input region and an output region in a mean shift iteration algorithm respectively, the pixels situated in the back projection B of the output region R2 and not in the input region R1 should be computed, and thus many unused pixels can be discarded to save lots of unnecessary consumption of the CPU resource. After the mean shift procedure is carried out, the procedure of the invention as shown in FIG. 8 adjusts the scalar of the detected face:

Step 800: Read and reference the PDF of a face model in a frame and the last detected rectangle.

Step 801: Compute the back projection of the current frame of the last detected rectangle.

Step 802: Use the mean shift algorithm to carry out an iteration for the rectangle.

Step 803: Compute the pixel of a back projection in a new shifted rectangle and not in the last detected rectangle. Since the face rectangle is shifted to a new position, it is necessary to compute the back projection of the rectangle again, but the present invention just computes the new pixels of the back projection to avoid the overlapped portion of new and old rectangles.

Step 804: Determine whether or not to complete the mean shift iteration program; if yes, then go to 805, or else return to Step 802.

Step 805: Compute the scalar of the new detected face.

Step 806: Compute a mean zero moment of the back projection in different scaled rectangle; wherein the zero moment is the total sum of the back projections in the rectangle, and the mean zero moment is used for representing a mean probability of skin color that belongs to the points in the rectangle. If the mean probability is greater than a predetermined threshold, then the detection is considered to be successful.

Step 807: Determine whether or not the zero moment is greater than the predetermined threshold; if yes, then go to Step 808; or else go to Step 809.

Step 808: Output the information of a detected face and the rectangle of a face frame, and end the detection program.

Step 809: Output an undetected face information, and end the tracking program.

Finally, the face rectangle $R_k$ of the invention is confirmed, and the face rectangle $R_k$ will be shown on a frame of the electronic capturing device. To show a smooth video for the captured image of the electronic capturing device, the present invention selects not to show the face rectangle directly on the captured image, and thus the present invention adds at least one transitional image between the face rectangle $R_k$ and the showing window $RS_{k-1}$ as follows:

If the first frame, $RS_0=R_0$ is set, and then the face rectangle is assumed to be $R_k$, and the window shown in the previous frame is $RS_{k-1}$, the x-axis direction shift is given by the following equation:

$$\vec{x} = \text{center}_{R_k} \cdot x - \text{center}_{RS_{k-1}} \cdot x$$

The y-axis direction shift is given by the following equation:

$$\vec{y} = \text{center}_{R_k} \cdot y - \text{center}_{RS_{k-1}} \cdot y$$

And its size scale is equal to:

$$s = \max\left(\frac{W_{R_k}}{W_{RS_{k-1}}}, \frac{H_{R_k}}{H_{RS_{k-1}}}\right)$$

Where, W and H are the width and height of the rectangle $R_k$ or showing widow $RS_{k-1}$ respectively. The accumulation numbers of the x-axis direction shift, the y-axis direction shift and the size scale (sumx, sumy and sums) are computed again. In other words, a change (a shift or a scale up/down) towards a direction will be carried out, if there are changes for several subsequent frames (such as 8 frames) in the same direction to assure the smoothness of the transitional change.

If the x-axis direction shift $\vec{x}$ is in the same direction with the previous frame, then the face rectangle will shift to the same x-axis direction, and sumx++, or else sumx=1. If the y-axis direction shift $\vec{y}$ is in a different direction with the previous frame, the face rectangle will shift to the same y-axis direction and sumy++, or else sumy=1. If s has the same scale up/down sign with the previous frame, it indicates that the face rectangle keeps on being scaled up or down.

Figure 9:
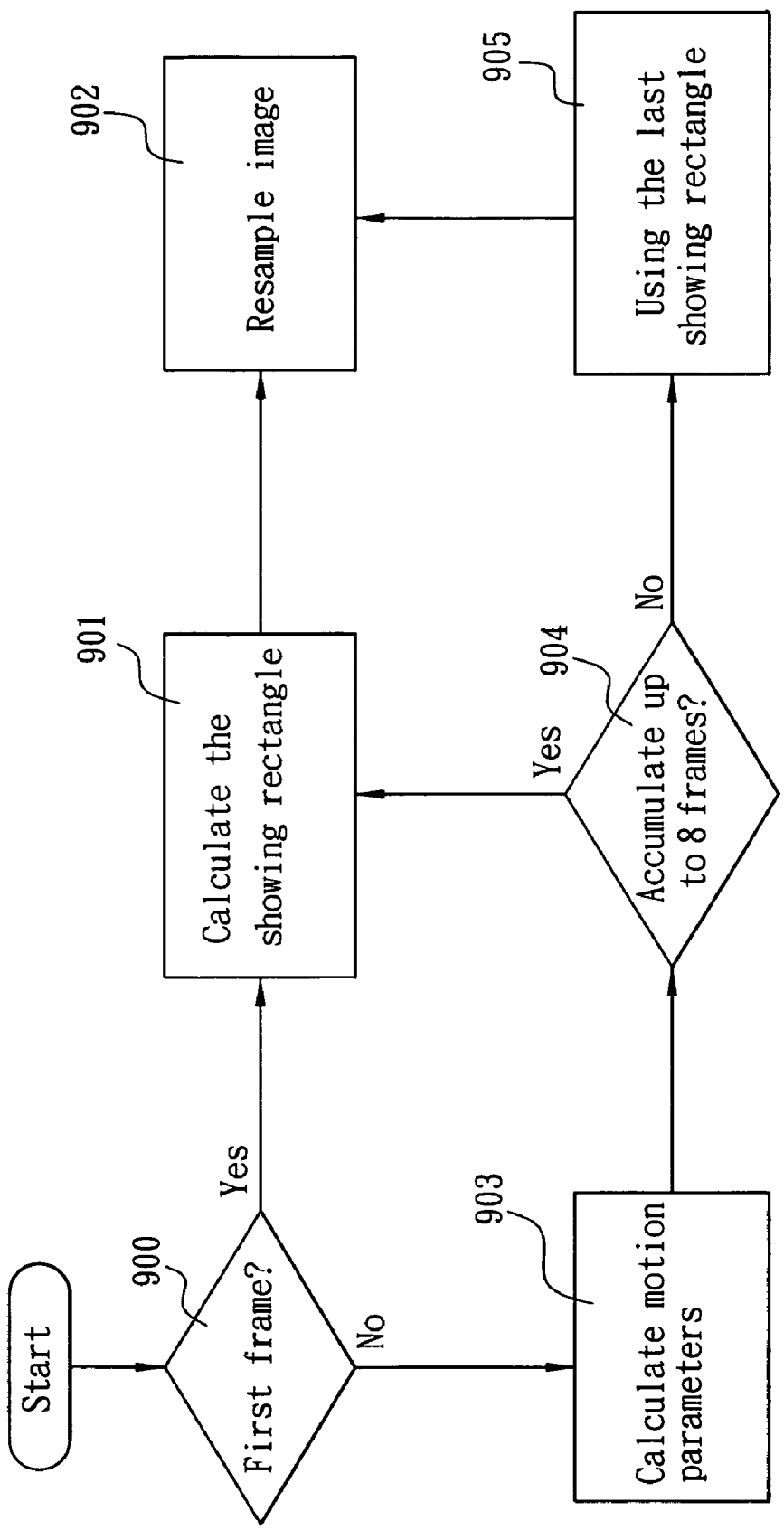
FIG. 9 is a flow chart of refocusing a detected and located face in accordance with the present invention.

In a preferred embodiment of the present invention, an accumulation number of 8 is used for illustrating the following procedure of refocusing the face rectangle $R_k$ as shown in FIG. 9:

Step 900: Determine whether or not to it is a first frame; if yes, then go to Step 901; or else go to Step 903.

Step 901: Compute the showing rectangle; If sumx>8, then $$RS_k = RS_{k-1} + \frac{\vec{x}}{10};$$

indicating that 8 subsequent frames shift to the same x-axis direction, then the position of the rectangle will shift to (dx/10) in the x-axis direction;

If sumy>8, then $$RS_k = RS_{k-1} + \frac{\vec{y}}{10};$$

indicating that 8 subsequent frames shift to the same y-axis direction, then the position of the rectangle will shift to (dy/10) in the y-axis direction;

If sums>8, then $$W_{RS_k} = W_{RS_{k-1}} + \frac{\Delta x}{20}, H_{RS_k} = H_{RS_{k-1}} + \frac{\Delta y}{20};$$

wherein $\Delta x = s \cdot W_{RS_{k-1}} - W_{RS_{k-1}}$, $\Delta y = s \cdot H_{RS_{k-1}} - H_{RS_{k-1}}$; indicating that 8 subsequent frames are scaled up or down, then the rectangle will be scaled up or down correspondingly.

Step 902: Resample and refocus a frame in the rectangle, and end the refocus program.

Step 903: Compute a motion parameter.

Step 904: Determine whether or not the number of frames is accumulated to eight; if yes, then go to Step 901, or else go to Step 905.

Step 905: Display the last showing rectangle, and go to Step 902.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method of automatically detecting and tracking a face by an electronic capturing device, comprising:
executing a face detecting algorithm to detect a face position in a frame in a red, green and blue (RGB) chromaticity space based on a skin color model, wherein said face detecting algorithm performs a color transformation for transforming said frame into a new frame in a hue, saturation and value (HSV) chromaticity space and comprises steps of:
calculating a histogram of hue of color pixels on said new frame when r>max(g,b, S) and S>38, wherein S represents saturation of said new frame, and r>max(g,b,S) and S>38 represents that intensity of red color of said frame is larger than maximum value of intensities of green color and blue color of said frame when the saturation S of said new frame is larger than 38;
obtaining a maximum value Maxh of said histogram of hue when number of said color pixels multiplied by 256 is larger than total number of all pixels on said new frame;
obtaining a smallest value i of said histogram of hue, such that said pixels of said new frame with hues falling within a histogram hue range [Maxh−i, Maxh+i] are determined to be skin color pixels respectively;

forming a mask for said skin color pixels;

marking a label for all continuous regions in said new frame for defining a rectangle corresponding to said label when a number of pixels of said continuous regions is larger than the total number of pixels on said new frame divided by 256;

using a face feature matching engine to analyze and determine whether an image within said rectangle is a face or not;

generating a detected rectangle for covering at least one rectangle; calculating a skin color probability density function for an image within said detected rectangle; and outputting information of detecting a face within said detected rectangle and displaying said detected rectangle on said new frame corresponding to said face; and executing a face tracking algorithm to detect face positions in subsequent new frames by using a nonparametric technique and a mean shift algorithm according to said face.

2. The method of claim 1, wherein said face detecting algorithm determines that color of a pixel x in said new frame belongs to a face skin color when $l \leq h(x) \leq u$, wherein $h(x)$ represents the hue of pixel x, and u and l represent upper and lower thresholds of the hue of said face skin color respectively and said thresholds are used for obtaining a binary face image.

3. The method of claim 2, wherein said face tracking algorithm tracks a new position and a new scalar of a face in a subsequent new frame next to said new frame according to said face color probability distribution obtained by said face detecting algorithm from said new frame.

4. The method of claim 3 wherein, when a back projection B(i, j) of said subsequent new frame defining a skin color probability P(F(i, j)) of pixels of said subsequent new frame corresponding to pixels F(i, j) of said face in said new frame is obtained, said mean shift algorithm is used for locating a local peak mode of a said face in said subsequent frame close to said face in said new frame on said back projection B(i, j).

5. The method of claim 4, wherein said face tracking algorithm comprises:

reading said skin color probability density function of said face within said detected rectangle on said new frame;

computing said back projection of said subsequent new frame corresponding to said face in said new frame;

using said mean shift algorithm to perform an iteration for defining a new detected rectangle on said subsequent new frame;

computing pixels of an image within said new detected rectangle;

computing a scalar of said image within said new detected rectangle when said iteration is completed;

computing a mean zero moment of said back projection, and said zero moment is total sum of said back projection, and said mean zero moment is provided for representing a mean probability of colors of pixels in said new detected rectangle belonging to a skin color, and when said mean probability is greater than a predetermined threshold, then said image in said new detected rectangle is considered to be said face; and outputting information of detecting said face within said new detected rectangle and displaying said new detected rectangle on said subsequent new frame corresponding to said face when said mean zero moment is greater than a predetermined threshold.

6. The method of claim 5, further comprising: driving a variable focal lens of said electronic capturing device to refocus said face in said subsequent new frame, when said face in said subsequent new frame is detected.

7. The method of claim 6, wherein when said new detected rectangle $R_k$ is confirmed, at least one transitional frame is added between said new detected rectangle $R_k$ and a showing window $RS_{k-1}$ of said electronic capturing device by performing steps of:

setting $RS_0 = R_0$ for a first new frame;

calculating a x-axis direction shift of said new detected rectangle according to an equation $\vec{x} = center_{R_k} \cdot x - center_{RS_{k-1}} \cdot x$, where $center_{R_k}$ and $center_{RS_{k-1}}$ represent centers of said new detected rectangle $R_k$ and said showing window $RS_{k-1}$ repectively;

calculating a y-axis direction shift of said new detected rectangle according to an equation $\vec{y} = center_{R_k} \cdot - center_{RS_{k-1}} \cdot y$;

calculating said scale of said new detected rectangle according to an equation $$s = \max\left(\frac{W_{R_k}}{W_{RS_{k-1}}}, \frac{H_{R_k}}{H_{RS_{k-1}}}\right),$$

where W and H represent width and height of said new detected rectangle $R_k$ or said showing window $RS_{k-1}$ respectively;

calculating accumulation numbers sumx, sumy and sums of said x-axis direction shift, said y-axis direction shift and said scalar;

shifting said new detected rectangle by said x-axis direction shift $\vec{x}$ in a x-axis direction same as said detected rectangle when sumx is incremented, otherwise, sumx=1;

shifting said new detected rectangle by said y-axis direction shift $\vec{y}$ in a y-axis direction same as said detected rectangle when sumy is incremented, otherwise, sumy=1; and scaling up or down said new detected rectangle when said scale of said new detected rectangle is same as said scale of said detected rectangle.

8. The method of claim 7, when refocusing said face within said new detected rectangle $R_k$, further comprising steps of:

shifting said new detected rectangle $R_k$ in a x-axis direction same as said detected rectangle, when sumx>8 and $$RS_k = RS_{k-1} + \frac{\vec{x}}{10}$$

which indicate that 8 subsequent new frames next to said new frame shift to a x-axis direction same as said new frame; shifting said new detected rectangle $R_k$ in a y-axis direction same as said detected rectangle when sumy>8 and $$RS_k = RS_{k-1} + \frac{\vec{y}}{10}$$

which indicate that 8 subsequent new frames next to said new frame shift in a y-axis direction same as said new frame; and scaling up or down said new detected rectangle $R_k$ in a scale same as said detected rectangle when sums>8 and $$W_{RS_k} = W_{RS_{k-1}} + \frac{\Delta x}{20}, H_{RS_k} = H_{RS_{k-1}} + \frac{\Delta y}{20};$$

wherein $\Delta x = s \cdot W_{RS_{k-1}} - W_{RS_{k-1}}$, $\Delta y = s \cdot H_{RS_{k-1}} - H_{RS_{k-1}}$ which indicate that 8 subsequent new frames next to said new frame are scaled up or down in a scale same as said detected rectangle; and resampling and refocusing said face within said new detected rectangle.

9. The method of claim 2 wherein, when obtaining a plurality of detected rectangles, said face feature matching engine determines that images within said detected rectangles are candidates, matches each of said candidates with an ellipse to determine whether or not said candidate contains a face, and compares a ratio of long radius to short radius of said ellipse corresponding to said candidate with a predetermined threshold; when the ratio of long radius to short radius of said ellipse corresponding to said candidate is greater than said predetermined threshold, then a face region corresponding to said candidate is discarded.

10. The method of claim 9, wherein said face tracking algorithm tracks a new position and a new scalar of a face in a subsequent new frame next to said new frame according to said face color probability distribution obtained by said face detecting algorithm from said new frame.

11. The method of claim 10 wherein, when a back projection $B(i, j)$ of said subsequent new frame defining a skin color probability $P(F(i, j))$ of pixels of said subsequent new frame corresponding to pixels $F(i, j)$ of said face in said new frame is obtained, said mean shift algorithm is used for locating a local peak mode of said face in said subsequent frame close to said face in said new frame on said back projection $B(i, j)$.

12. The method of claim 11, wherein said face tracking algorithm comprises:
  reading said skin color probability density function of said face within said detected rectangle on said new frame;
  computing said back projection of said subsequent new frame corresponding to said face in said new frame;
  using said mean shift algorithm to perform an iteration for defining a new detected rectangle on said subsequent new frame;
  computing pixels of an image within said new detected rectangle;
  computing a scalar of said image within said new detected rectangle when said iteration is completed;
  computing a mean zero moment of said back projection, and said zero moment is total sum of said back projection, and said mean zero moment is provided for representing a mean probability of colors of pixels in said new detected rectangle belonging to a skin color, and when said mean probability is greater than a predetermined threshold, then said image in said new detected rectangle is considered to be said face; and
  outputting information of detecting said face within said new detected rectangle and displaying said new detected rectangle on said subsequent new frame corresponding to said face when said mean zero moment is greater than a predetermined threshold.

13. The method of claim 12, further comprising: driving a variable focal lens of said electronic capturing device to refocus said face in said subsequent new frame, when said face in said subsequent new frame is detected.

14. The method of claim 13, wherein when said new detected rectangle $R_k$ is confirmed, at least one transitional frame is added between said new detected rectangle $R_k$ and a showing window $RS_{k-1}$ of said electronic capturing device by performing steps of:
  setting $RS_0 = R_0$ for a first new frame;
  calculating a x-axis direction shift of said new detected rectangle according to an equation
  $\vec{x} = \text{center}_{R_k} \cdot x - \text{center}_{RS_{k-1}} \cdot x$, where center $R_k$ and center $RS_{k-1}$ represent centers of said new detected rectangle $R_k$ and said showing window $RS_{k-1}$ repectively;
  calculating a y-axis direction shift of said new detected rectangle according to an equation
  $\vec{y} = \text{center}_{R_k} \cdot y - \text{center}_{RS_{k-1}} \cdot y$;
  calculating said scale of said new detected rectangle according to an equation $$s = \max\left(\frac{W_{R_k}}{W_{RS_{k-1}}}, \frac{H_{R_k}}{H_{RS_{k-1}}}\right),$$

where W and H represent width and height of said new detected rectangle $R_k$ or said showing window $RS_{k-1}$ respectively;
  calculating accumulation numbers sumx, sumy and sums of said x-axis direction shift, said y-axis direction shift and said scalar; shifting said new detected rectangle by said x-axis direction shift $\vec{y}$ in a x-axis direction same as said detected rectangle when sumx is incremented, otherwise, sumx=1;
  shifting said new detected rectangle by said y-axis direction shift $\vec{y}$ in a y-axis direction same as said detected rectangle when sumy is incremented, otherwise, sumy=1; and
  scaling up or down said new detected rectangle when said scale of said new detected rectangle is same as said scale of said detected rectangle.

15. The method of claim 14, when refocusing said face within said new detected rectangle $R_k$, further comprising steps of:
  shifting said new detected rectangle $R_k$ in a x-axis direction same as said detected rectangle, when sumx>8 and $$RS_k = RS_{k-1} + \frac{\vec{x}}{10}$$

which indicate that 8 subsequent new frames next to said new frame shift to a x-axis direction same as said new frame; shifting said new detected rectangle $R_k$ in a y-axis direction same as said detected retangle when sumy>8 and $$RS_k = RS_{k-1} + \frac{\vec{y}}{10}$$

which indicate that 8 subsequent new frames next to said new frame shift in a y-axis direction same as said new frame; and scaling up or down said new detected rectangle $R_k$ in a scale same as said detected rectangle when sums>8 and $$W_{RS_k} = W_{RS_{k-1}} + \frac{\Delta x}{20}, H_{RS_k} = H_{RS_{k-1}} + \frac{\Delta y}{20};$$

wherein $\Delta x = s \cdot W_{RS_{k-1}} - W_{RS_{k-1}}$, $\Delta y = s \cdot H_{RS_{k-1}} - H_{RS_{k-1}}$ which indicate that 8 subsequent new frames next to said new frame are scaled up or down in a scale same as said detected rectangle; and resampling and refocusing said face within said new detected rectangle.

16. The method of claim 9, wherein said candidate is matched with said ellipse by applying a principal components analysis (PCA) technique on a pixel $x_i$ on said new frame, where $x_i$ is in form of a column vector and $i=1, \ldots, n$, and using a sample mean vector $\tilde{u}$ and a sample covariance matrix $\tilde{\Sigma}$ to estimate following mean vector $\mu$ and covariance matrix $\Sigma$:

$$\mu \cong \tilde{\mu} = \frac{1}{n}\sum_{i=1}^{n} x_i, \text{ and } \Sigma = \tilde{\Sigma} = \frac{1}{n-1}\sum_{i=1}^{n}(x_i - \mu)(x_i - \mu)^t$$

where, eigenvalues $\lambda_i$ and normalized eigenvectors $e_i$ of said covariance matrix $\Sigma$ satisfy the following equations:

$\Sigma e_i = \lambda_i e_i$ $\|e_i\| = 1$ $<e_i, e_j> = 0$ and eigenvector $e_i$ corresponding to a largest eigenvalue $\lambda_i$ of said covariance matrix $\Sigma$ is a mean direction of a sample distribution, and eigenvector $e_i$ corresponding to a second largest eigenvalue $\lambda_i$ is another mean direction of said sample distribution, which is a second most important distribution and, when dimension d=2, the result can determine whether or not said face fits said ellipse.

17. The method of claim 16, wherein said face tracking algorithm tracks a new position and a new scalar of a face in a subsequent new frame next to said new frame according to said face color probability distribution obtained by said face detecting algorithm from said new frame.

18. The method of claim 17 wherein, when a back projection B(i, j) of said subsequent new frame defining a skin color probability P(F(i, j)) of pixels of said subsequent new frame corresponding to pixels F(i, j) of said face in said new frame is obtained, said mean shift algorithm is used for locating a local peak mode of a said face in said subsequent frame close to said face in said new frame on said back projection B(i, j).

19. The method of claim 18, wherein said face tracking algorithm comprises:
reading said skin color probability density function of said face within said detected rectangle on said new frame;
computing said back projection of said subsequent new frame corresponding to said face in said new frame;
using said mean shift algorithm to perform an iteration for defining a new detected rectangle on said subsequent new frame;
computing pixels of an image within said new detected rectangle;
computing a scalar of said image within said new detected rectangle when said iteration is completed;
computing a mean zero moment of said back projection, and said zero moment is total sum of said back projection, and said mean zero moment is provided for representing a mean probability of colors of pixels in said new detected rectangle belonging to a skin color, and when said mean probability is greater than a predetermined threshold, then said image in said new detected rectangle is considered to be said face; and
outputting information of detecting said face within said new detected rectangle and displaying said new detected rectangle on said subsequent new frame corresponding to said face when said mean zero moment is greater than a predetermined threshold.

20. The method of claim 19, further comprising: driving a variable focal lens of said electronic capturing device to refocus said face in said subsequent new frame, when said face in said subsequent new frame is detected.

21. The method of claim 20, wherein when said new detected rectangle $R_k$ is confirmed, at least one transitional frame is added between said new detected rectangle $R_k$ and a showing window $RS_{k-1}$ of said electronic capturing device by performing steps of:
setting $RS_0 = R_0$ for a first new frame;
calculating a x-axis direction shift of said new detected rectangle according to an equation $\vec{x} = \text{center}_{R_k} \cdot x - \text{center}_{RS_{k-1}} \cdot x$, where center $R_k$ and center$_{RS_{k-1}}$ represent centers of said new detected rectangle $R_k$ and said showing window $RS_{k-1}$ repectively;
calculating a y-axis direction shift of said new detected rectangle according to an equation $\vec{y} = \text{center}_{R_k} \cdot y - \text{center}_{RS_{k-1}} \cdot y$;
calculating said scale of said new detected rectangle according to an equation $$s = \max\left(\frac{W_{R_k}}{W_{RS_{k-1}}}, \frac{H_{R_k}}{H_{RS_{k-1}}}\right),$$

where W and H represent width and height of said new detected rectangle $R_k$ or said showing window $RS_{k-1}$ respectively;
calculating accumulation numbers sumx, sumy and sums of said x-axis direction shift, said y-axis direction shift and said scalar;
shifting said new detected rectangle by said x-axis direction shift $\vec{x}$ in a x-axis direction same as said detected rectangle when sumx is incremented, otherwise, sumx=1;
shifting said new detected rectangle by said y-axis direction shift $\vec{y}$ in a y-axis direction same as said detected rectangle when sumy is incremented, otherwise, sumy=1; and
scaling up or down said new detected rectangle when said scale of said new detected rectangle is same as said scale of said detected rectangle.

22. The method of claim 21, when refocusing said face within said new detected rectangle $R_k$, further comprising steps of:
shifting said new detected rectangle $R_k$ in a x-axis direction same as said detected rectangle, when sumx >8 and $$RS_k = RS_{k-1} + \frac{\vec{x}}{10}$$

which indicate that 8 subsequent new frames next to said new frame shift to a x-axis direction same as said new frame;

shifting said new detected rectangle $R_k$ in a y-axis direction same as said detected rectangle when sumy>8 and $$RS_k = RS_{k-1} + \frac{\vec{y}}{10}$$

which indicate that 8 subsequent new frames next to said new frame shift in a y-axis direction same as said new frame; and scaling up or down said new detected rectangle $R_k$ in a scale same as said detected rectangle when sums>8 and $$W_{RS_k} = W_{RS_{k-1}} + \frac{\Delta x}{20}, H_{RS_k} = H_{RS_{k-1}} + \frac{\Delta y}{20};$$

wherein $\Delta x = s \cdot W_{RS_{k-1}} - W_{RS_{k-1}}$, $\Delta y = s \cdot H_{RS_{k-1}} - H_{RS_{k-1}}$ which indicate that 8 subsequent new frames next to said new frame are scaled up or down in a scale same as said detected rectangle; and resampling and refocusing said face within said new detected rectangle.

23. The method of claim 16, wherein center of said ellipse is a mean vector, rotation angle of said ellipse is a direction of said main eigenvector with a major axis and a minor axis selected respectively to be $r \times \sqrt{\lambda_1}$ and $r \times \sqrt{\lambda_2}$, r is a ratio falling in a range of numeric values from 1.8 to 2.2, a discard formula $$\frac{\sqrt{\lambda_1}}{\sqrt{\lambda_2}} > 2.5,$$

is used, and said image within said detected rectangle and complying with said discard formula is considered as a non-human face and is discarded.

24. The method of claim 23, wherein said face tracking algorithm tracks a new position and a new scalar of a face in a subsequent new frame next to said new frame according to said face color probability distribution obtained by said face detecting algorithm from said new frame.

25. The method of claim 24 wherein, when a back projection B(i, j) of said subsequent new frame defining a skin color probability P(F(i, j)) of pixels of said subsequent new frame corresponding to pixels F(i, j) of said face in said new frame is obtained, said mean shift algorithm is used for locating a local peak mode of a said face in said subsequent frame close to said face in said new frame on said back projection B(i, j).

26. The method of claim 25, wherein said face tracking algorithm comprises:
reading said skin color probability density function of said face within said detected rectangle on said new frame;
computing said back projection of said subsequent new frame corresponding to said face in said new frame;
using said mean shift algorithm to perform an iteration for defining a new detected rectangle on said subsequent new frame;
computing pixels of an image within said new detected rectangle;
computing a scalar of said image within said new detected rectangle when said iteration is completed;
computing a mean zero moment of said back projection, and said zero moment is total sum of said back projection, and said mean zero moment is provided for representing a mean probability of colors of pixels in said new detected rectangle belonging to a skin color, and when said mean probability is greater than a predetermined threshold, then said image in said new detected rectangle is considered to be said face; and
outputting information of detecting said face within said new detected rectangle and displaying said new detected rectangle on said subsequent new frame corresponding to said face when said mean zero moment is greater than a predetermined threshold.

27. The method of claim 26, further comprising: driving a variable focal lens of said electronic capturing device to refocus said face in said subsequent new frame, when said face in said subsequent new frame is detected.

28. The method of claim 27, wherein when said new detected rectangle $R_k$ is confirmed, at least one transitional frame is added between said new detected rectangle $R_k$ and a showing window $RS_{k-1}$ of said electronic capturing device by performing steps of:
setting $RS_0 = R_0$ for a first new frame;
calculating a x-axis direction shift of said new detected rectangle according to an equation
$\vec{x} = center_{R_x} \cdot x - center_{RS_{k-1}} \cdot x$, where $center_{R_k}$ and $center_{RS_{k-1}}$ represent centers of said new detected rectangle $R_k$ and said showing window $RS_{k-1}$ repectively;
calculating a y-axis direction shift of said new detected rectangle according to an equation
$\vec{y} = center_{R_k} \cdot y - center_{RS_{k-1}} \cdot y$;
calculating said scale of said new detected rectangle according to an equation $$s = \max\left(\frac{W_{R_k}}{W_{RS_{k-1}}}, \frac{H_{R_k}}{H_{RS_{k-1}}}\right),$$

where W and H represent width and height of said new detected rectangle $R_k$ or said showing window $RS_{k-1}$ respectively;
calculating accumulation numbers sumx, sumy and sums of said x-axis direction shift, said y-axis direction shift and said scalar;
shifting said new detected rectangle by said x-axis direction shift $\vec{x}$ in a x-axis direction same as said detected rectangle when sumx is incremented, otherwise, sumx=1;
shifting said new detected rectangle by said y-axis direction shift $\vec{y}$ in a y-axis direction same as said detected rectangle when sumy is incremented, otherwise, sumy=1; and
scaling up or down said new detected rectangle when said scale of said new detected rectangle is same as said scale of said detected rectangle.

29. The method of claim 28, when refocusing said face within said new detected rectangle $R_k$, further comprising steps of:
shifting said new detected rectangle $R_k$ in a x-axis direction same as said detected rectangle, when sumx>8 and $$RS_k = RS_{k-1} + \frac{\vec{x}}{10}$$

which indicate that 8 subsequent new frames next to said new frame shift to a x-axis direction same as said new frame; shifting said new detected rectangle $R_k$ in a y-axis direction same as said detected rectangle when sumy>8 and $$RS_k = RS_{k-1} + \frac{\vec{y}}{10}$$

which indicate that 8 subsequent new frames next to said new frame shift in a y-axis direction same as said new frame; and scaling up or down said new detected rectangle $R_k$ in a scale same as said detected rectangle when sums>8 and $$W_{RS_k} = W_{RS_{k-1}} + \frac{\Delta x}{20}, H_{RS_k} = H_{RS_{k-1}} + \frac{\Delta y}{20};$$

wherein $\Delta x = s \cdot W_{RS_{k-1}} - W_{RS_{k-1}}$, $\Delta y = s \cdot H_{RS_{k-1}} - H_{RS_{k-1}}$ which indicate that 8 subsequent new frames next to said new frame are scaled up or down in a scale same as said detected rectangle; and resampling and refocusing said face within said new detected rectangle.

* * * * *